United States Patent [19]

Biondetti

[11] 4,293,988
[45] Oct. 13, 1981

[54] CONTROLLED DEFLECTION ROLL
[75] Inventor: Mario Biondetti, Schio, Italy
[73] Assignee: Escher Wyss Limited, Zurich, Switzerland
[21] Appl. No.: 144,772
[22] Filed: Apr. 28, 1980
[30] Foreign Application Priority Data
  May 15, 1979 [CH] Switzerland ............ 4499/79
[51] Int. Cl.³ ............................ B21B 13/02
[52] U.S. Cl. ............................ 29/116 AD
[58] Field of Search ....... 29/113 R, 113 AD, 116 AD
[56] References Cited
  U.S. PATENT DOCUMENTS
  3,879,827  4/1975  Lehmann ............ 29/116 AD
  3,919,753 11/1975  Lehmann et al. ..... 29/113 AD
  4,007,522  2/1977  Hold et al. ........ 29/113 X
  4,241,482 12/1980  Biondetti .......... 29/116 AD Primary Examiner—Wayne L. Shedd
Attorney, Agent, or Firm—Werner W. Kleeman

[57] ABSTRACT

A controlled deflection roll comprising at least one piston-like or punch-like pressure or support element which is provided with a bearing or contact surface upon which there can slide or bear the roll shell of the controlled deflection roll. The bearing or support arrangement at the respective ends of the roll shell, is equipped with throttle disk means for limiting the infeed of a hydraulic fluid medium, typically oil, to the bearings of the bearing arrangements, from an intermediate compartment or chamber located between the roll shell and its roll support or beam. Additionally, between the bearing and an outer seal means there is arranged an outflow element, such as an outflow conduit, for the withdrawal of the oil or other hydraulic medium.

6 Claims, 5 Drawing Figures

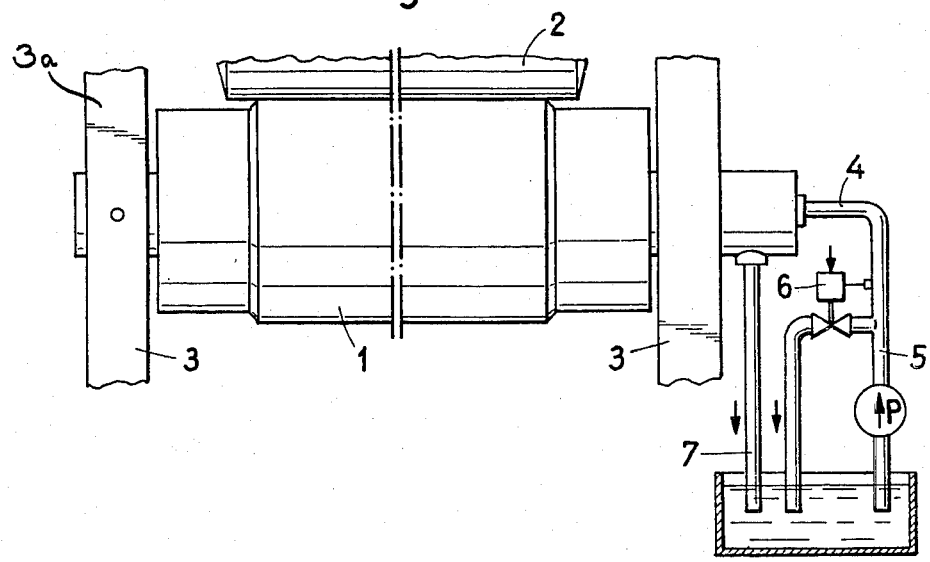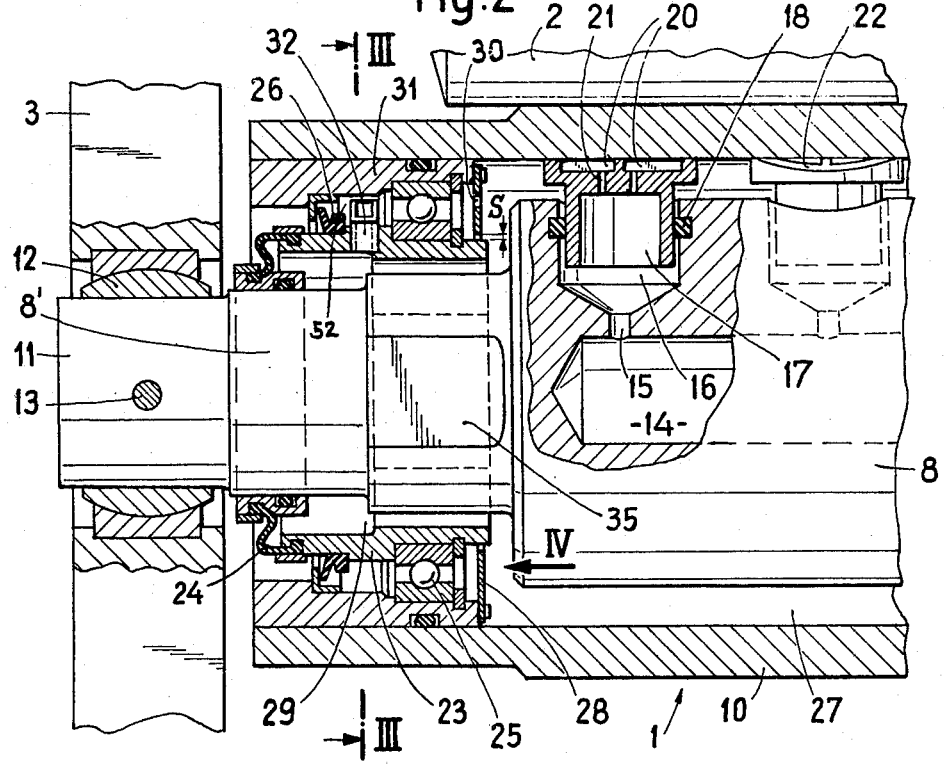

CONTROLLED DEFLECTION ROLL

BACKGROUND OF THE INVENTION

The present invention relates to a new and improved construction of a controlled deflection roll, sometimes also referred to in the art as a roll with bending or sag compensation.

Generally speaking, the controlled deflection roll of the present development is of the type comprising a stationary roll support or beam and a roll shell which is mounted to be rotatable about such stationary roll support. The roll shell is supported upon the roll support or beam with the aid of at least one piston-like or punch-like pressure or support element. This pressure or support element is provided with a bearing or contact surface, upon which the roll shell, during operation of the controlled deflection roll, can slide or bear with the aid of a liquid film or layer. Additionally, the ends of the roll shell are mounted upon anti-friction bearings, typically for instance roller bearings, and these roll shell ends are sealed towards the outside by shaft seals.

Controlled deflection rolls of this type are known, for instance, from U.S. Pat. No. 4,047,273, granted Sept. 13, 1977 and U.S. Pat. No. 4,048,701, granted September 20, 1977. Although controlled deflection rolls constructed according to these principles have been found to be completely satisfactory in practise, in many instances difficulties arise in terms of providing a faultless seal of the rotatable roll shell towards the outside.

During operation, the intermediate chamber or compartment between the roll support and the roll shell receives a liquid medium, as a rule hydraulic oil, in which there must move the roller bearings or equivalent anti-friction bearing means. An excessive quantity of oil is disadvantageous in terms of realizing a faultless operation of the roller bearings. Additionally, also the shaft seals, which seal towards the outside the intermediate chamber between the roll shell and the roll support, are exposed to a large quantity of oil, so that also in this regard difficulties can arise.

SUMMARY OF THE INVENTION

Therefore, with the foregoing in mind it is a primary object of the present invention to provide a new and improved construction of controlled deflection roll which is not associated with the aforementioned drawbacks and limitations of the prior art constructions.

Another and more specific object of the present invention aims at providing a new and improved construction of controlled deflection roll which affords improved running conditions for the roller bearings or the like and the shaft seals, and therefore, enables attaining an increased operational reliability of these components.

Now in order to implement these and still further objects of the invention, which will become more readily apparent as the description proceeds, the controlled deflection roll of the present development is manifested by the features that at the side of each of the anti-friction bearings, typically roller bearings, confronting the intermediate chamber or compartment between the roll support and the roll shell, there is arranged a throttle disk having throttle openings or holes, and that between the roller bearings and the shaft seal there is located an outflow element, for instance in the form of an outflow conduit for the removal of the liquid.

The throttle disk or plate together with the related outflow or outfeed conduit, enables an exact dosing of the quantity of hydraulic fluid medium or liquid, here assumed to be oil, located at the region of the roller bearings and the shaft seals during operation of the controlled deflection roll. This quantity of oil can be regulated such that it is optimum for lubrication of the roller bearings, and that there does not occur any excessive drive losses and heating of the roller bearings due to the quantity of oil. At the same time, it is also thereby possible to protect the shaft seals, since, during system operation, they are only exposed to slight quantities of oil.

The sum of the cross-sectional areas of the throttle openings or holes of the throttle disk should be smaller than the flow cross-sectional area of the outflow conduit. By virtue of these measures there is achieved the beneficial result that, more oil can be withdrawn through the outflow conduit or equivalent structure than oil flows through the throttle openings. Hence, at the region of the related bearing and the shaft seal there is always only present a slight amount of oil which can be exactly calculated.

The outflow or outfeed conduit can be connected with an outwardly leading bore or channel provided at the roll support. This particularly simple expedient can be advantageously employed with controlled deflection rolls wherein the roll shell is directly mounted at the roll support with the aid of the roller bearings.

However, it is also possible to provide bushings or sleeves which encircle a respective end of the roll support, are capable of carrying out a translatory movement perpendicular to the lengthwise axis of the roll support and relative to said roll support, but are secured against any rotation in relation to the roll support. The roller or ball bearing means and the shaft seal are located between the bushing or sleeve and the roll shell, the intermediate compartment is tightly sealed off towards the outside between the bushing and the related end of the roll support, and the outflow conduit opens into the intermediate compartment between the bushing and its related end of the roll support.

This construction of the invention is suitable for controlled deflection rolls wherein the roll shell is capable of carrying out, in relation to the roll support, lifting or displacement movements in order to form the requisite contact or pressure force.

Preferably a plurality of pressure or support elements can be provided, possessing bearing or contact surfaces having hydrostatic bearing pockets, which are connected at an infeed means or line for a pressurized fluid medium which is at a pressure suitable for providing a hydrostatic bearing or support arrangement. This design is known, for instance, from both of the aforementioned U.S. Pat. Nos. 4,047,273 and 4,048,701. However, the teachings of the invention can also be employed in analogous manner, even in the case of controlled deflection rolls, which while possessing a hydrostatic bearing or support arrangement, however have a hydrodynamic sliding bearing arrangement for the roll shell upon the roll support. One possible example of such type of roll has been disclosed in German Pat. No. 1,561,706.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1 is a schematic fragmentary view of a rolling mill or device equipped with a controlled deflection roll constructed according to the invention;

FIG. 2 is an enlarged fragmentary sectional view of one end of the controlled deflection roll of the arrangement of FIG. 1;

DETAILED DESCRIPTION OF THE PREFERRED EMBODIMENTS

Figure 3:
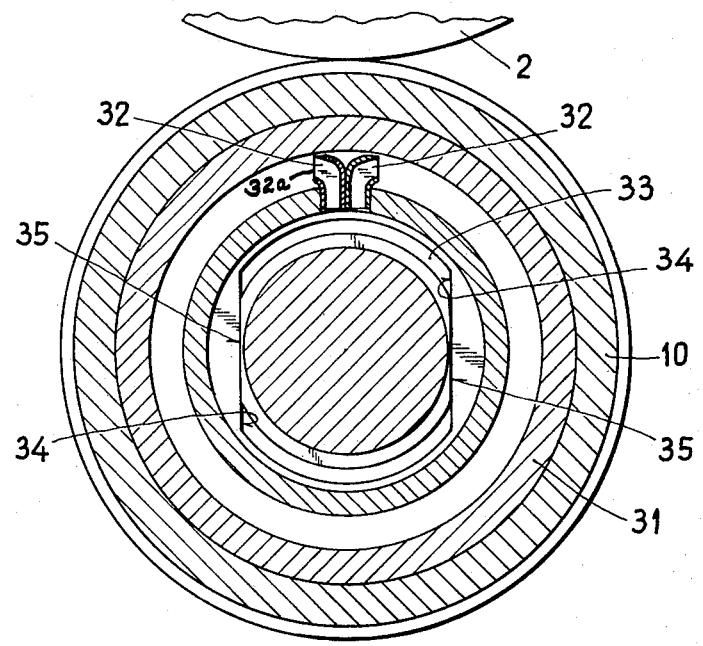
FIG. 3 is a cross-sectional view of the controlled deflection roll shown in FIG. 2, taken substantially along the line III—III thereof.

Describing now the drawings, it is to be understood that only enough of the construction of the controlled deflection roll of the present development has been shown in order to enable those skilled in the art to readily understanding the underlying principles and concepts of the invention. Turning now to FIG. 1, there is shown in fragmentary view and schematically a rolling mill or device containing a controlled deflection roll 1 and a counter roll 2. Both the controlled deflection roll 1 and the counter roll 2 are mounted in the side elements or portions 3 of a suitable frame arrangement, generally indicated by reference character 3a, these side elements 3 only having been partially illustrated since details thereof are totally unimportant for the understanding of the invention. The controlled deflection roll 1 is connected with the conveying or feed line 4 of a feed or supply pump 5 equipped with a conventional pressure regulator 6. Withdrawal of the hydraulic fluid medium, typically oil, out of the confines of the controlled deflection roll 1, is accomplished for instance by means of a return flow line or conduit 7. The arrangement of the feed line 4 and the return flow line 7, which does not constitute subject matter of the invention, and thus need not here be further described, is known, by way of example, from the previously mentioned U.S. Pat. Nos. 4,047,273 and 4,048,701.

With reference now to the sectional view of FIG. 2, there are shown details of one end region of the controlled deflection roll, and it is to be understood that the opposite end region of the controlled deflection roll may be identically constructed. Therefore, for the purpose of this disclosure it will suffice to consider the arrangement illustrated at the portrayed end of the controlled deflection roll 1 shown in FIG. 2. According to the showing of FIG. 2, this controlled deflection roll 1 comprises a roll support or beam 8 and a roll shell 10 which is mounted to be rotatable about the roll support 8. The journal 11 of the illustrated end portion or region of the roll support 8 is pivotably supported, at the related side element 3, by means of a spherical bearing or bearing means 12, but, however, prevented from carrying out any rotational movement by any suitable element serving this purpose, such as the here depicted pin 13 or equivalent structure. The roll support 8 is provided with a supply bore or channel 14, which is connected with the supply or feed line 4. Connection bores 15 lead from the supply or feed bore or channel 14 to cylinder bores or chambers 16. Within these cylinder bores or chambers 16, in the embodiment under discussion, there are sealingly movably guided substantially piston-like pressure or support elements 17 in their related seals or sealing elements 18. The piston-like pressure or support elements 17 are provided with hydrostatic bearing or contact pockets 20, which are connected by throttle bores or ports 21 with the pressurized space of the related cylinder bore or chamber 16. In this manner, during operation, there is not only realized a hydrostatic support of the roll shell 10 upon the roll support or beam 8, but at the same time there is also provided a hydrostatic bearing or support arrangement between the bearing surface 22 of the pressure or support elements 17, where there are formed the bearing pockets 20, and the roll shell 10. Further details regarding the mode of operation of this type of construction of controlled deflection roll has been given in U.S. Pat. No. 3,802,044, granted Apr. 9, 1974, to which reference may be readily had and the disclosure of which is incorporated herein by reference as is equally the disclosure of the aforementioned U.S. Pat. Nos. 4,047,273 and 4,048,701.

As also will be recognized by the illustration of FIG. 2, the end 8' of the roll support 8, located internally of the roll shell 10, is surrounded by a bearing bushing or sleeve 23 which is movable in relation to the roll support 8. The intermediate space or chamber 29 between the bearing bushing 23 and the end 8' of the roll support 8 is sealed towards the outside by any suitable sealing element 24, here shown as a rubber seal.

At the outer surface or outside of the bearing bushing 23 there is arranged a roller bearing 25 and a shaft seal 26. It is to be understood that in the context of this disclosure the term "roller bearing" is used in its broadest sense to encompass any suitable anti-friction bearing means or equivalent structure. At the side of the roller bearing 25, confronting the intermediate chamber or compartment 27 between the roll support 8 and the roll shell 10, there is located a substantially ring-shaped throttle disk or plate 28, which, as best seen by referring to FIG. 4, is equipped with throttle holes or openings 30. The throttle disk 28, as shown in FIG. 2, is secured to an outer bushing or sleeve 31, upon which there is supported the bearing 25 and which forms part of the roll shell 10 and is movable along therewith. Outflow elements, here shown for instance in the form of outflow conduits 32, serve for the withdrawal of the hydraulic oil out of the intermediate space or chamber 52 between the throttle disk 28 and the shaft seal 26. In accordance with the showing of FIG. 3, there are provided two such type outflow or outfeed conduits 32 which are arranged such that their mouth portions 32a are arranged so as to face in opposite directions. With this arrangement there is realized the advantage that the same is suitable for both rotational directions of the controlled deflection roll 1. In the event that such controlled deflection roll 1 only should be designed for one direction of rotation, then there is adequate the use of only one of the outflow tubes or conduits 32 of the arrangement of FIG. 3.

Figure 4:
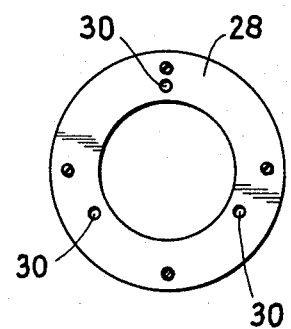
FIG. 4 is a front view of the throttle disk used in the arrangement of FIG. 2, looking in the direction of the arrow IV—IV thereof.

The outflow conduits 32, as shown in FIGS. 2 and 3, open into the intermediate space 29 located between the roll support end 8' and the bearing bushing or sleeve 23.

During operation, the hydraulic pressurized oil arrives from the feed or conveying conduit 4 into the infeed bore 14 and from the latter into the cylinder bores or chambers 16. The pressure of the infed oil biases the related piston-like pressure or support element 17 towards the roll shell 10 and, in turn, presses the roll shell 10 in this manner against the counter roll 2. At the same time the oil passes through the throttle bores 21 into the bearing pockets 20 and insures that in such bearing pockets 20 there prevails a hydrostatic bearing or support arrangement of the roll shell 10 upon the pressure or support elements 17, while maintaining a lubricant oil film of a certain size. Hence, there is realized a hydrostatic bearing or support arrangement of the movable roll shell 10 with minimum friction, while eliminating any direct contact between the parts or components. The oil which effluxes out of the bearing pockets 20 is conducted out of the intermediate space or chamber 27 through a suitable bore provided in conventional fashion in the roll support or beam 8 and through the conduit or tube 7. Details of the manner in which it is possible, by way of example, to withdraw the oil or hydraulic fluid medium, and which do not really constitute subject matter of the present development, have been disclosed, by way of example and not limitation, in the previously mentioned U.S. Pat. No. 4,048,701.

Therefore, it is unavoidable that a certain quantity of oil will be located in the intermediate chamber or space 27, which rotates in conjunction with the roll shell 10, and at higher circumferential speeds will be intensively placed into turbulence due to the action of the stationary pressure or support elements 17. Part of this oil passes through the holes or openings 30 of the related throttle disk or plate 28 in a dosed manner to the corresponding bearing 25, to thereby lubricate such bearing. The oil passing out of the bearing 25 thereafter arrives at the region of the outflow conduit or tube 32 and is conducted by the latter into the intermediate space or chamber 29 between the bearing bushing 23 and the roll end 8', from which it is returned back into the intermediate chamber or space 27. It should be recalled that, during operation, the oil in the roll shell 10 forms an essentially ring-shaped oil film or layer, and thus, can be scraped off by the ends of the outflow conduits or tubes 32.

By virtue of the described measures it is possible to relatively exactly dose the infeed of oil to the bearing 25, and therefore, to insure that the inflowing oil is reliably transported away by the outflow or outfeed conduit 32. For this purpose, it is necessary that the flow cross-section or cross-sectional area of the relevant outflow conduit or tube 32 is greater than the sum of the cross-sectional areas of the openings 30 of the throttle disk or plate 28 as well as a gap S which is located between the inner circumference of the throttle disk 28 and the bearing bushing 23. As a rule, however, this gap S can be maintained so small that it is negligible.

The embodiment of FIGS. 2 and 3, as already mentioned, has particular utility in those fields of application where the roll shell 10 not only carries out a rotational movement relative to the roll support or beam 8, but at the same time also is movable perpendicular to the lengthwise axis of the roll support 8. As best seen by reverting to the showing of FIGS. 2 and 3, in order to obtain movements in the press or contact plane, i.e., in the direction of and away from the counter roll 2, the bearing bushing 23 is provided with an elongate or extended opening 33 which is bounded by two lateral guide surfaces 34. These guide surfaces 34 are movable along similar guide surfaces 35 of the roll support 8. This type of construction of controlled deflection roll is well known to the art from U.S. Pat. No. 3,885,283, to which reference may be readily had and the disclosure of which is incorporated herein by reference.

Figure 5:
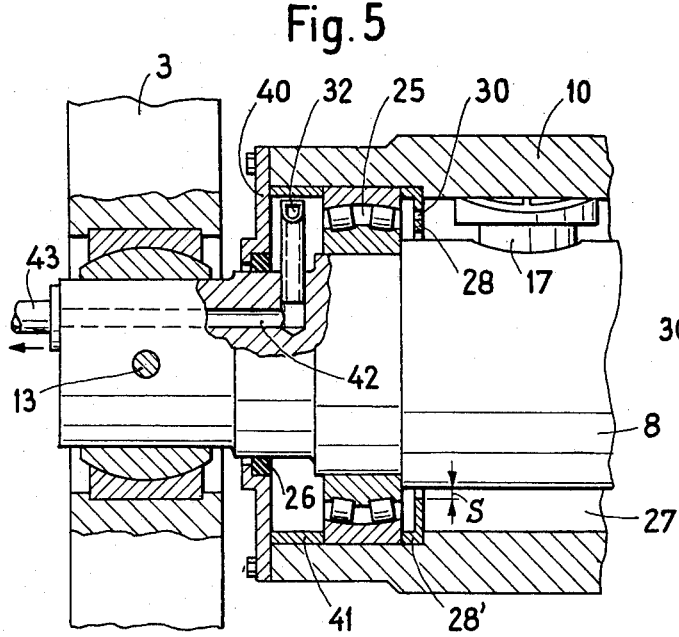
FIG. 5 is a sectional view, corresponding to the showing of FIG. 2, of a controlled deflection roll wherein the roll shell is rotatably mounted directly upon the roll support or beam.

FIG. 5 illustrates a simplified construction of controlled deflection roll, which can be employed in those fields of application where the roll shell 10 is mounted directly by roller bearings upon the roll support or beam 8, i.e., where the translatory mobility of the roll shell in the direction perpendicular to the axis of the roll support is dispensed with. At this point it is briefly mentioned that as a matter of convenience there have been used in FIG. 5, for the same or analogous components, generally the same reference characters as have been employed for the construction of controlled deflection roll as discussed above in relation to FIGS. 2 and 3.

With the embodiment of FIG. 5 the roll shell 10 is mounted upon a roller bearing 25, which is directly supported upon the roll support or beam 8. The outer end 10' of the roll shell 10 is closed by a cover disk or plate 40, within which there is secured the shaft seal 26. The throttle disk or plate 28 having the openings or holes 30 and a gap S, possesses a lateral shoulder or bent portion 28' serving as a spacer ring and enables a pivotal mobility of the inner ring or race 25a of the roller bearing 25 in relation to the outer race or ring 25b of such roller bearing. Between the cover disk 40 and the bearing 25 there is also located a spacer ring 41.

With this embodiment the outflow conduit or tube 32 is connected with a bore or channel 42 provided at the roll support or beam 8, leading out of such roll support 8 towards the outside, and at which there is connected a return flow line or conduit 43. In all other respects the mode of operation of this embodiment is essentially like the embodiment described above in conjunction with FIGS. 2 and 3.

As already mentioned, while as a matter of convenience in illustration in FIGS. 2 and 5 there has only been shown the one end or end region of the corresponding controlled deflection roll, it should be understood that the other end or end region of each such controlled deflection roll is similarly constructed as concerns the bearing or support arrangement. The only differences, basically, are the connections for the infeed and the withdrawal of the hydraulic oil, which, as will be recalled, do not constitute subject matter of the present invention and may be conventionally designed as is well known in many different constructions in this particular technology.

With the exemplary embodiments of the present invention oil has been used, by way of example, as the hydraulic liquid or fluid medium. However, it is to be understood that with controlled deflection rolls of the type under discussion it is also possible to use other liquids, for instance water which contains suitable additives.

While there are shown and described present preferred embodiments of the invention, it is to be distinctly understood that the invention is not limited thereto, but may be otherwise variously embodied and practiced within the scope of the following claims.

What I claim is:

1. A controlled deflection roll comprising:
a stationary roll support;
a rotatable roll shell;
means for mounting said rotatable roll shell for rotation about said stationary roll support;
at least one pressure element for supporting the rotatable roll shell upon said stationary roll support;
said pressure element being provided with bearing surface means upon which there bears said roll shell, during operation of said controlled deflection roll, with the aid of a liquid film;
said roll shell having opposed ends;
said means for rotatably mounting said roll shell comprising bearing means arranged at the opposed ends of said roll shell;
seal means for sealing the opposed ends of said roll shell towards the outside;
said roll shell and said stationary roll support forming therebetween an intermediate chamber;
a throttle disk provided with throttle openings arranged at the side of each related one of said bearing means confronting said intermediate chamber between said roll support and said roll shell; and
outflow means for the withdrawal of the liquid arranged between the bearing means and said seal means.

2. The controlled deflection roll as defined in claim 1, wherein:
said outflow means possesses a predetermined flow cross-sectional area; and
the sum of the cross-sectional areas of the throttle openings of the throttle disk being smaller than the flow cross-sectional area of said outflow means.

3. The controlled deflection roll as defined in claim 1, wherein:
said outflow means comprises an outflow conduit;
said roll support having bore means leading towards the outside; and
said outflow conduit being connected with said bore means of said roll support.

4. The controlled deflection roll as defined in claim 2, further including:
bearing bushing means surrounding a related end of said roll support;
said roll support having a lengthwise axis;
each said bearing means being translatorily movable essentially perpendicular to said lengthwise axis of said roll support and relative to said roll support;
means for securing each said bearing bushing means from carrying out rotational movements relative to said roll support;
said bearing means and said seal means of each related end of said controlled deflection roll being disposed between said bearing bushing means and said roll shell;
each said bearing bushing means and its related end of the roll support forming therebetween an intermediate space;
means for sealing said intermediate space towards the outside; and
said outflow means opening into said intermediate space between said bearing bushing means and said related end of said roll support.

5. The controlled deflection roll as defined in claim 1, wherein:
a plurality of said pressure elements are provided, each of which contains said bearing surface means;
each of said bearing surface means of each pressure element containing hydrostatic bearing pocket means; and
means for the infeed of a pressurized fluid medium defining said liquid to said hydrostatic bearing pocket means at a predetermined pressure.

6. A controlled deflection roll comprising:
a stationary roll support;
a rotatable roll shell;
means for mounting said rotatable roll shell for rotation about said stationary roll support;
at least one pressure element for supporting the rotatable roll shell upon said stationary roll support;
said pressure element being provided with bearing surface means upon which there bears said roll shell, during operation of said controlled deflection roll;
said roll shell having opposed ends;
said means for rotatably mounting said roll shell comprisng bearing means arranged at least at one opposed end of said roll shell;
seal means for sealing said at least one opposed end of said roll shell towards the outside;
said roll shell and said stationary roll support forming therebetween an intermediate chamber;
a throttle disk provided with throttle openings arranged at said at least one opposed end at the side of the related bearing means which confronts said intermediate chamber between said roll support and said roll shell; and
outflow means for the withdrawal of the liquid arranged between the bearing means and said seal means at said at least one opposed end of said roll shell.

* * * * *